Oct. 17, 1967     O. SEPALL ET AL     3,347,628

PRODUCTION OF CHLORINE DIOXIDE

Filed Dec. 28, 1964     3 Sheets-Sheet 1

INVENTOR
Ola Sepall
Raoul C. Buser
Harold A. Weir
PATENT AGENT

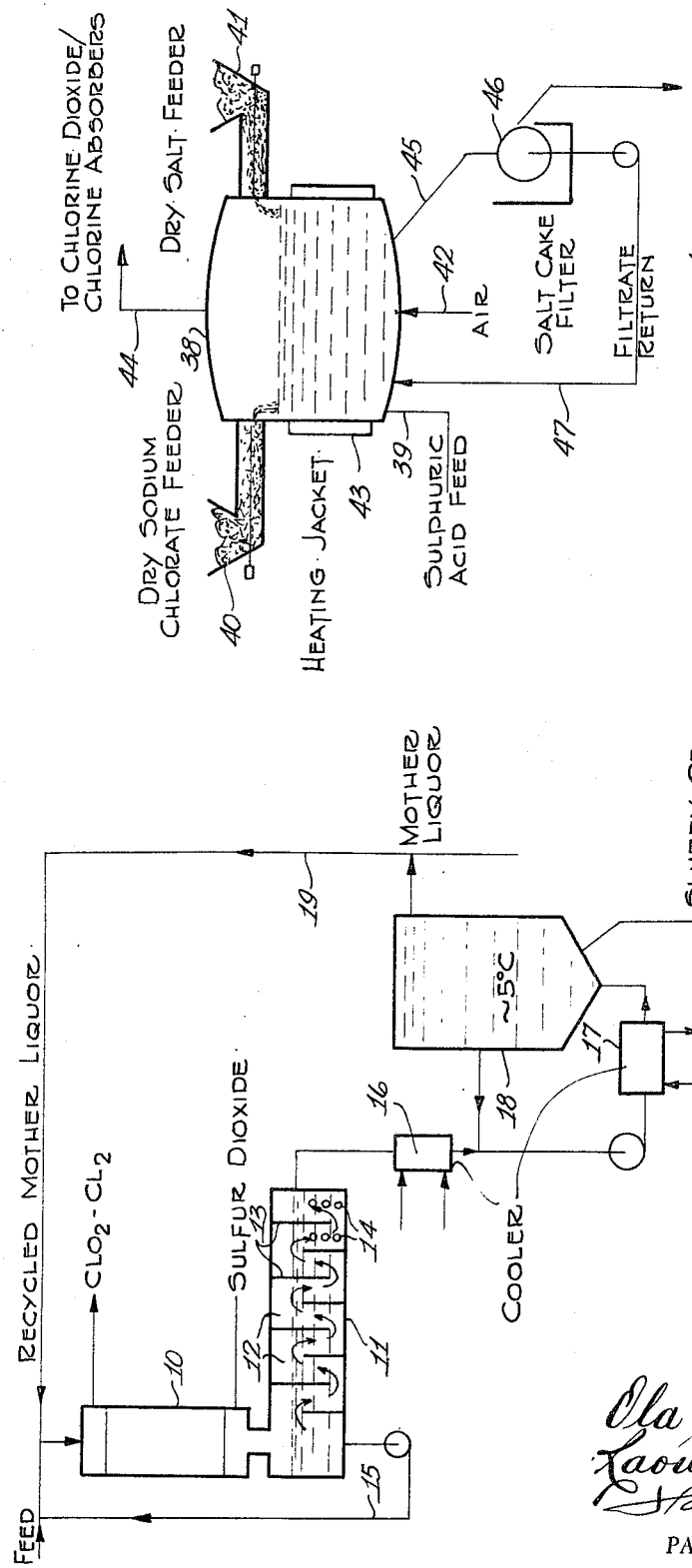

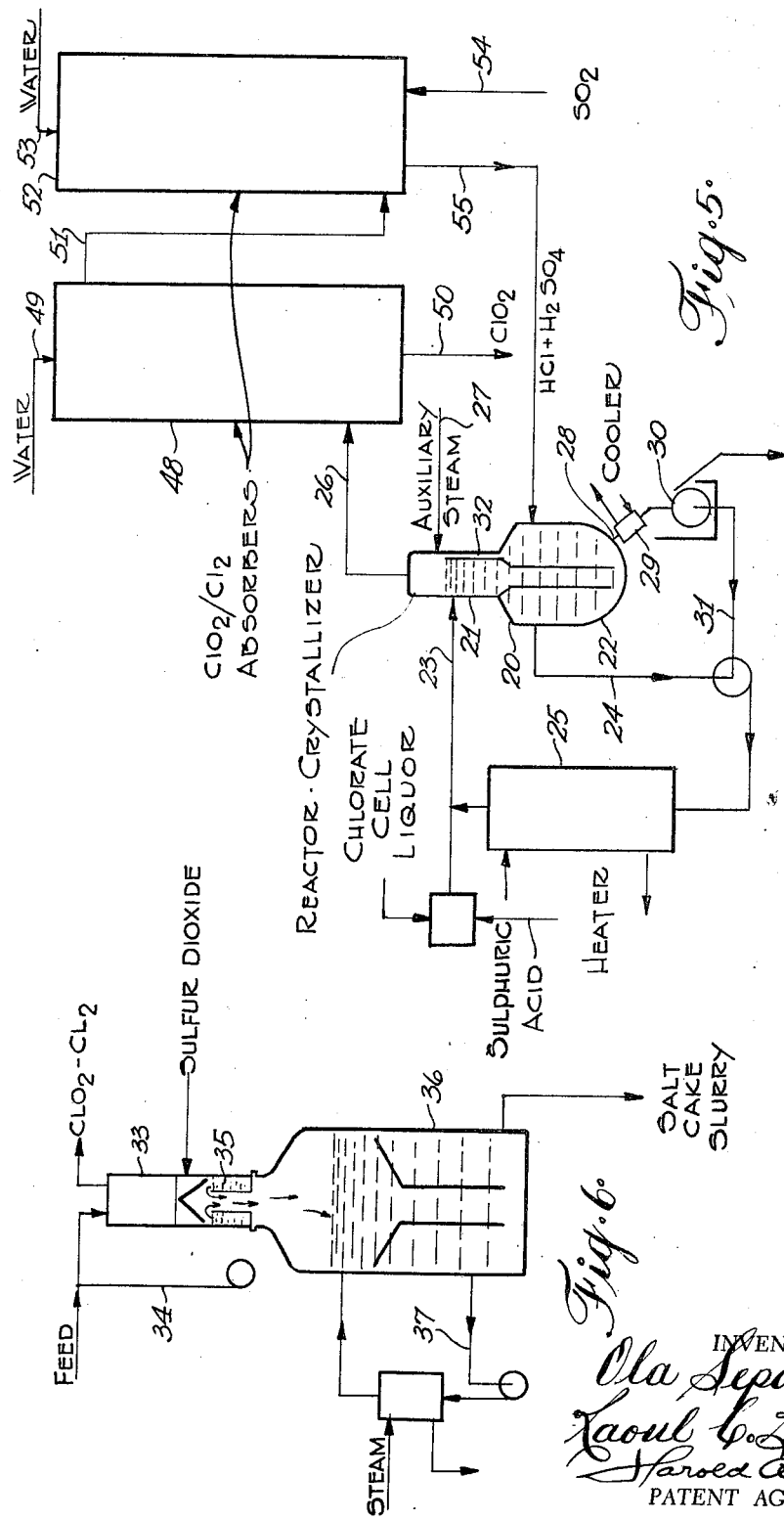

United States Patent Office 3,347,628
Patented Oct. 17, 1967

3,347,628
PRODUCTION OF CHLORINE DIOXIDE
Ola Sepall and Raoul C. Buser, Quebec City, Quebec, Canada, assignors to Anglo Paper Products, Limited, Quebec City, Quebec, Canada
Filed Dec. 28, 1964, Ser. No. 421,559
12 Claims. (Cl. 23—121)

ABSTRACT OF THE DISCLOSURE

The process of the invention relates to the common manner of producing chlorine dioxide by effecting the reaction of sodium chlorate with sodium chloride or hydrochloric acid and either or both of sulfuric acid and sulfur dioxide. The concentration in the reaction mixture of the chlorate is maintained at a value exceeding 0.5 and the concentration of the chloride in the mixture is maintained at 0.5 to about 4.5 molar. This concentration serves to assist in maintaining the acidity of the solution at from about 1.8 to a value less than 6 normal which is important in ensuring that the sodium sulfate formed in the reaction is in neutral form whereby it may be recovered as a neutral salt directly from the spent liquor of the reaction.

---

This invention relates to the production of chlorine dioxide.

There are many commercial processes available for manufacturing chlorine dioxide and while various combinations of reactants can be used, the basic reaction is that of sodium chlorate and hydrochloric acid. There are several factors which must be considered in the choice of process since, obviously, the one having the greatest overall economy is to be preferred. These factors include cost of chemicals, possibility of recovery of byproducts and re-use of spent liquor, and complexity of operating procedures.

In most conventional processes, as heretofore proposed, it has been considered necessary to maintain the acidity of the reaction solution as high as about 10 normal in order to achieve the maximum reaction of chemicals and thus minimize chemical losses in the effluent from the reactor. It is, of course, desirable to recover sodium sulfate from the spent liquor but, in these prior commercial processes, the neutral salt has not been successfully recovered because the acid sulfate is formed under the acidic conditions which are used in the reactor. Recovery of a neutral salt is advantageous because (a) the neutral salt can be readily marketed to kraft mills, and (b) the acid salt represents an expense because of loss of acid from the process.

An object of the present invention is to provide a process for low cost manufacture of chlorine dioxide including the provision of a convenient and economical recovery system.

A more specific object is to provide a process of chlorine dioxide production wherein sodium sulfate may be recovered as a neutral salt directly from the spent liquor.

Another object is to provide a process of chlorine dioxide production wherein the mother liquor remaining after recovery therefrom of neutral sodium sulfate is susceptible to re-use in the process.

The principal aspect of the invention may be said to reside broadly in a process of producing chlorine dioxide which comprises effecting the reaction of metallic chlorate with hydrochloric acid in a reacting solution while maintaining the terminal acidity of the solution at less than 6 normal, removing the chlorine and chlorine dioxide formed in the reaction, and crystallizing neutral sulfate salt from the liquor of the solution.

Another aspect of the invention contemplates, in combination with the conventional process of manufacturing chlorine dioxide by reacting in a generator sodium chlorate, sulfuric acid and sodium chloride, including the steps of reacting sodium chlorate with hydrochloric acid in the presence of sulfate ions, the steps of reacting the spent liquor with sodium chloride, recovering hydrochloric acid and sodium sulfate, and recycling said hydrochloric acid to said generator.

Figure 1:
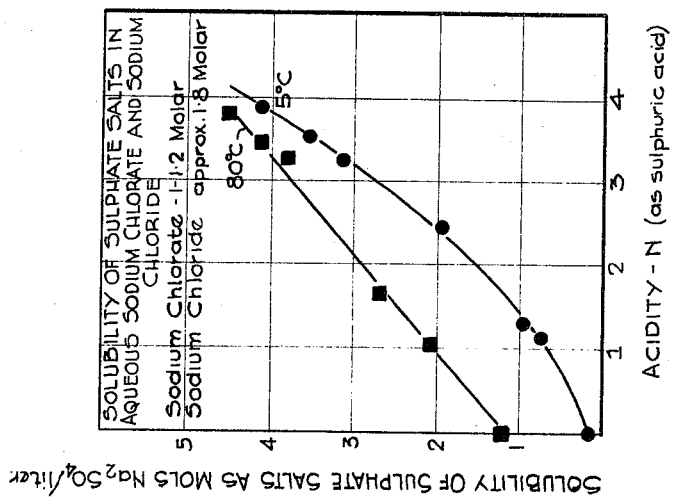
Figure 2:
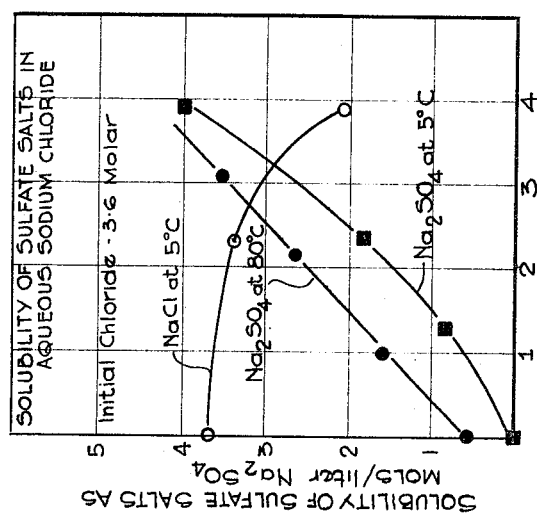
Figure 3:
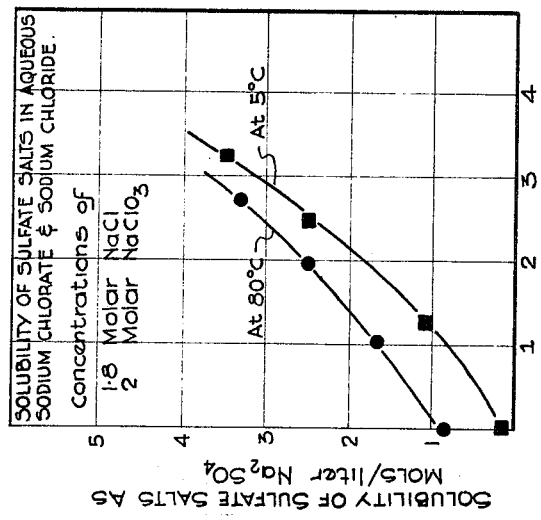

In the ensuing description, reference will be made to the accompanying drawings, in which FIGURES 1, 2 and 3 are graphs showing the solubility of sodium sulfate salts in various mixtures with sodium chlorate, sodium chloride, and sulfuric acid, and FIGURES 4, 5, 6, and 7 are diagrammatic illustrations of various types of apparatus suitable for carrying out the process of the present invention.

The present invention utilizes the reaction of metallic chlorate with hydrochloric acid to produce chlorine dioxide and the acid is produced either entirely by reacting sulfuric acid and sodium chloride according to

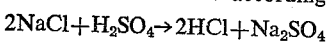

or also by the reduction of chlorine in the presence of water. It is well known that, for this purpose, there are available many reducing agents such as methanol, oxalic acid and the like, which will react with chlorine to produce hydrochloric acid. For instance, sulphur dioxide may be employed according to

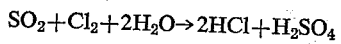

The sulfuric acid formed in the latter case may be subsequently used to produce HCl by reaction with NaCl as indicated above.

An essential condition of the reacting solution in accordance with the principal aspect of the invention resides in the fact that the acidity of such solution must be less than 6 normal and is preferably less than 3 normal.

A high concentration of both sodium chlorate and sodium chloride is required in the effluent in order to achieve rapid reaction. In conventional processes, the concentration of the chlorate, as well as the chloride, is less than 0.5 molar and generally about 0.2 molar. In the present process, the concentration of the chlorate and the chloride is in excess of 0.5 molar and is preferably about 1 molar.

A reaction temperature of about 40° C. to 107° C. (corresponding to the boiling point) may be employed. A high temperature is usually desirable since rapid reaction is thereby obtained and consequently less reaction time is required. With low acidity, as in the present process, the rate is quite small at low temperatures and values below about 40° C. are less feasible for commercial application. There is, however, no specific upper temperature limit. For instance, the process operates satisfactorily at a temperature of 150° C.

The following Tables I, II, and III give examples of appropriate reactant combinations and reaction conditions:

TABLE I.—EXAMPLE SHOWING PRODUCTION OF CHLORINE DIOXIDE USING SULFUR DIOXIDE AND NO SULFURIC ACID

Feed composition including recycled liquor:
  Sodium chlorate _____ 279 g./l.
  Sodium chloride _____ 140 g./l.
  Acidity _____ 1.8 N (from recycled liquor).
Feed rate _____ 700 ml./hr.
Sulfur dioxide rate _____ 56 g./hr.
Chlorine dioxide production rate _____ 63 g./hr.
Chlorine production rate _____ 19 g./hr.
Recoverable sodium sulfate _____ 110 g./hr.
Reactor effluent composition:
  Sodium chlorate _____ 118 g./l.
  Sodium chloride _____ 110 g./l.
  Acidity _____ 2.1 N.
Specific chemical consumption based on 1 g. chlorine dioxide:
  Sodium chlorate _____ 1.8 g.
  Sodium chloride _____ 0.33 g.
  Sulfur dioxide _____ 0.80 g.
Reaction conditions:
  Initial temperature _____ 40° C.
  Terminal temperature _____ 107° C.
  Retention time _____ 1½ hr.

TABLE II.—EXAMPLE SHOWING PRODUCTION OF CHLORINE DIOXIDE USING SULFURIC ACID AND NO SULFUR DIOXIDE

Feed composition including recycled liquor:
  Sodium chlorate ____ 206 g./l.
  Sodium chloride ____ 198 g./l.
  Acidity _____ 1.8 N (from recycled liquor).
Feed rate _____ 1000 ml./hr. of above solution.
                        86 g./hr. of sulfuric acid.
Production rate _____ 41 g./hr. of chlorine dioxide.
                        49 g./hr. of chlorine.
                        125 g./hr. of recoverable sodium sulfate.
Reactor effluent composition:
  Sodium chlorate ____ 128 g./l.
  Sodium chloride ____ 128 g./l.
  Acidity _____ 1.8 N.
Specific chemical consumption based on 1 g. chlorine dioxide:
  Sodium chlorate _____ 1.8 g.
  Sodium chloride _____ 1.6 g.
  Sulfuric acid _____ 2.1 g.
Reaction conditions:
  Initial temperature ___ 30° C.
  Terminal temperature _ 107° C.
  Retention time _____ 1 hr.

TABLE III.—EXAMPLE SHOWING PRODUCTION OF CHLORINE DIOXIDE USING SULFURIC ACID AND SULFUR DIOXIDE SIMULTANEOUSLY

Feed composition including recycled liquor:
  Sodium chlorate _____ 240 g./l.
  Sodium chloride _____ 170 g./l.
  Acidity _____ 2.0 N (from recycled liquor).
Feed rate _____ 1000 ml./hr. of above solution.
                            40 g./hr. of sulfuric acid.
                            38 g./hr. of sulfur dioxide.
Production rate _____ 67 g./hr. of chlorine dioxide.
                            44 g./hr. of chlorine.
Reactor effluent composition:
  Sodium chlorate _____ 119 g./l.
  Sodium chloride _____ 122 g./l.
  Acidity _____ 2.0 N.
Specific chemical composition based on 1 g. chlorine dioxide:
  Sodium chlorate _____ 1.8 g.
  Sodium chloride _____ 0.7 g.
  Sulfuric acid _____ 0.6 g.
  Sulfur dioxide _____ 0.57 g.
Reaction conditions:
  Initial temperature _____ 40° C.
  Terminal temperature __ 107° C.
  Retention time _____ 1¼ hrs.

Table I lists typical operating conditions when using sodium chlorate, sodium chloride, and sulfur dioxide. In this case, the terminal acidity after reaction was 2.1 N. It may be noted that about 40% of the sodium chlorate added was not consumed in the reaction and the invention contemplates that it would be recycled to the generator with the mother liquor after crystallization of the sodium sulfate.

Table II sets forth another set of conditions which are typical when operating with sodium chlorate, sodium chloride, and sulfuric acid. In this case, the terminal acidity was about 1.8 N, the terminal chlorate was about 1.2 molar, and the terminal chloride was about 2 molar.

Table III shows typical conditions when operating with sodium chlorate, sodium chloride, and with both sulfur dioxide and sulfuric acid. The terminal reaction concentrations are again similar to those of the foregoing examples.

It should be observed that the quantity of by-product chlorine varies from about 30% (Table I) of the $ClO_2$ to about 120% (Table II) while the recoverable sodium sulfate ranged from about 170% (Table I) to about 300% (Table II) based on the weight of the $ClO_2$.

As previously indicated, a significant feature of the invention is the crystallization of neutral sodium sulfate from the spent liquor after the reaction is completed, and the low terminal acidity in the specified range makes this possible.

An important factor that has a large influence on the terminal acidity is the concentration of chloride ions in the reaction solution. To illustrate this effect, examples are presented in Table IV of reactions performed with different chloride concentrations:

TABLE IV.—EXAMPLES SHOWING THE EFFECT OF CHLORIDE CONCENTRATION ON TERMINAL ACIDITY

[Initial concentrations: 4.2 molar sodium chlorate; 1.7 molar sodium chlorate]

| Acids Added | | Terminal Concentrations | | | | | |
|---|---|---|---|---|---|---|---|
| HCl, equivalent/liter | H$_2$SO$_4$, equivalent/liter | After 1 hr. Boiling | | | Chloride Molar | Acid N | Chlorate Molar |
| | | Chloride | Acid N | Chlorate | | | |
| 8.0 | 0.5 | -------- | 0.21 | -------- | 4.5 | 0.16 | 0.9 |
| 7.5 | 1.0 | -------- | 0.33 | -------- | 3.9 | 0.30 | 1.0 |
| 6.5 | 2.0 | -------- | 0.68 | -------- | 3.2 | 0.64 | 1.0 |
| 5.5 | 3.0 | -------- | 1.12 | -------- | 2.5 | 0.93 | 1.0 |
| 5.0 | 3.5 | -------- | 1.5 | -------- | 2.1 | 1.2 | 1.5 |
| 4.0 | 4.5 | -------- | 1.7 | -------- | 1.8 | 1.7 | 1.6 |
| Experiment with 1.8 molar sodium chloride and about 1.0 molar sodium chlorate | | | | | | | |
| -------- | 3.0 | 1.4 | 2.2 | 0.8 | -------- | -------- | -------- |
| -------- | 3.5 | 1.0 | 2.6 | 0.6 | -------- | -------- | -------- |
| -------- | 4.5 | 0.84 | 3.3 | 0.5 | 0.71 | 3.0 | 0.4 |

In each case, the reactants were mixed and heated at boiling temperature for one and two hours. As the reaction proceeds, the acidity decreases, and the results show that very little reaction occurs after one hour. The chloride concentration in the terminal liquor varies from 4.5 molar to 0.71 molar and the corresponding acidities range from 0.16 N to 3.0 N. The examples clearly show the important relationship of chloride concentration to terminal acidity. It will be apparent that other conditions, such as retention time and chlorate concentration, will also have some effect upon terminal conditions.

The importance of acidity upon the crystallization of sodium sulfate is shown by the results plotted in FIGURES 1, 2 and 3. These figures indicate the solubility of sodium sulfate salts in various mixtures with sodium chlorate, sodium chloride, and sulfuric acid. In each case the solubility is given at 5° C. and at 80° C. to show the quantity of salt that can be recovered by cooling and crystallizing. In every case, the solubility curves at the two temperatures tend to converge at higher acidity. Thus, the higher acidity is less desirable because less sodium sulfate is recoverable. At sufficiently high acidity, it is also known that acid salts will be precipitated and this is not desired for the reasons already mentioned. It is evident, from the data provided, that it is possible to recover sodium sulfate at acidities up to 4 N and even higher but that it is preferable to operate at an acidity below 3 because the difference in solubility at the two temperatures is greater. Of course, if crystallization is induced by evaporation only without cooling, this consideration is not important and it is desirable only to avoid crystallizing the acid salt. In this case, it is possible to operate at acidities of up to about 6 N, as shown by the experiments outlined in Table V, which indicate that the neutral salt is obtained if the acidity does not exceed 5.7 N.

TABLE V.—EFFECT OF ACIDITY UPON CRYSTAL PRECIPITATED BY BOILING

| Acidity N: | Equivalents of acid/mol sodium sulphate in recovered crystal |
|---|---|
| 4.35 | 0.036 |
| 5.45 | 0.042 |
| 5.7 | 0.026 |
| 6.1 | 0.27 |
| 6.35 | 0.54 |
| 6.80 | 0.54 |
| 6.85 | 0.53 |

FIGURES 1, 2 and 3 also show the effect of sodium chlorate and sodium chloride concentration on the solubility of sulfate salts at 80° C. and 5° C. Increased chloride and chlorate both reduce the solubility of the sulfate salts and, moreover, the recoverable sulfate obtained by cooling is reduced. Consequently, it is desirable to avoid very high concentrations of chlorate and chloride when crystallizing is conducted by cooling. FIGURE 1 illustrates typical conditions of chlorate and chloride concentrations which are suitable for crystallization and which are also suitable as terminal conditions in the reaction mixture. However, it will be understood that this process can be operated over a wide range of conditions within the limitations set forth.

Table VI lists data showing a typical recovery of sodium sulfate decahydrate from the reactor effluent:

TABLE VI.—EXAMPLE SHOWING RECOVERY OF SODIUM SULFATE DECAHYDRATE

Reactor effluent composition:
  Acidity _____ 1.7 N.
  Chloride _____ 1.46 mols/liter.
  Chlorate _____ 0.80 mols/liter.
  Sulfate _____ 2.71 mols/liter.

After cooling to 5° C. and separating the crystals formed, the mother liquor composition was:
  Acidity _____ 2.1 N.
  Chloride _____ 1.86 mols/liter.
  Chlorate _____ 1.0 mols/liter.
  Sulfate _____ 2.1 mols/liter.
Reduction in solution volume after crystallization _____ 200 cc./liter.
Sodium sulfate decahydrate separated __ 1.0 mol/liter of effluent.

It will be observed that the concentration of all components, except the sulfate, increase as a result of the crystallization. It is evident from the changes in concentration that no component other than sodium sulfate decahydrate is separated in the crystallization.

In the examples discussed, the reaction temperature in all cases terminated at about 107° C., corresponding to the boiling point. The desirability of employing a high temperature has previously been discussed. However, the reaction will, of course, occur also at lower temperatures as shown by the examples in Table VII:

TABLE VII.—REACTION RATES AT DIFFERENT TEMPERATURES

[Initial Concentration: Sodium chlorate, 1.0 molar; sodium chloride, 1.8 molar; sulfuric acid, 5.5 N]

| Temperature | After 8 hours | | |
|---|---|---|---|
| | Acidity N | Chloride Molar | Chlorate Molar |
| 40° C | 4.3 | 1.3 | 0.57 |
| 24° C | 4.7 | 1.6 | 0.80 |

As hereinbefore mentioned, the invention contemplates the recycling of the mother liquor remaining after crystallization of the sodium sulfate to the reacting solution.

Referring to FIGURE 4, a system is therein illustrated which is suitable for operation with sulfur dioxide as a reactant. The system comprises a packed tower 10 to which the feed of aqueous sodium chlorate and sodium chloride, as well as sulfur dioxide, is indicated. From the tower, the resulting liquor flows into a reaction chamber 11 divided into communicating sections or compartments 12 by baffles 13 which limit mixing between the compartments. Arrows indicate the flow of solution from one compartment to another. It will be appreciated that the compartments 12 provide successive sections of the reaction zone and that there will be a rising temperature gradient in the successive sections. Heating coils 14 may be provided in some of the sections as required to achieve a desired temperature gradient. Some liquor may be recirculated through the tower by means of line 15 to improve tower performance. Spent liquor is led through coolers 16 and 17 to a crystallizer 18 where it is cooled to about 5° C. Crystals of sodium decahydrate are separated, and recovered mother liquor is recycled to the tower through line 19.

FIGURE 5 illustrates a system which may be employed when sulfuric acid is used without sulfur dioxide. A single vessel 20 has therein an upper body portion 21 in communication with a lower body portion 22. Chlorate cell liquor and sulfuric acid is fed into the vessel at 23. Recirculation of liquor is provided by line 24 in which a heater 25 is located. The $ClO_2$ and $Cl_2$ formed is removed at 26. Auxiliary steam is added at 27. The sodium sulfate crystal containing liquor is removed at 28 through cooler 29 and the salt removed by filter 30, with the remaining liquor recirculated at 31. A vent 32 leading from the lower portion of the vessel permits chlorine and chlorine dioxide formed therein to reach the gas space in the vessel above the solution.

There is also illustrated in FIGURE 5 a manner of usefully recovering $Cl_2$ which may be employed in other embodiments of the invention. As shown, the gases are led into a conventional packed tower 48 to which water is added at 49 and $ClO_2$ solution is removed at 50. The remaining gas, predominantly $Cl_2$ flows through line 51 into tower 52 to which water is added at 53 and $SO_2$ at 54. The resulting HCl and $H_2SO_4$ may be fed back to the reaction vessel through line 55.

FIGURE 6 shows another system wherein $SO_2$ is used as one of the reactants. Feed chemicals are fed to a conventional packed tower 33 along with recirculated liquor from line 34. The liquor flows into a reactor 35, from which the spent liquor overflows directly into a conventional crystallizer 36 where crystallization is induced by evaporation. Sodium sulfate is removed from the conventional crystallizer and $ClO_2$ is carried out of the system at 37 by steam to which air may be added as a diluent.

Referring to FIGURE 7, a single vessel 38 has a sulfuric acid feed line 39, a feed device 40 for dry sodium chlorate, and a feed device 41 for dry sodium chloride. The vessel is provided with a heating jacket 43. Air is fed to the solution at 42. The formed $ClO_2$ and $Cl_2$ flows from the vessel at 44. Crystallization of the sodium sulfate formed is induced in the solution by reason of the dry feed of the reacting chemicals. The crystal-containing liquor is withdrawn at 45 and the salt cake removed by filter 46, with the filtrate returned through line 47.

It wil be evident from the foregoing description that a basic feature of the invention resides in the step of reducing acidity in the process to a sufficient extent whereby a neutral sodium sulfate is recovered instead of the acid salt, and there has been described one manner of conducting the process to achieve this result.

Another manner of achieving this result is by reaction of the excess acid with sodium chloride so as to recover hydrochloric acid and anyhdrous sodium sulphate. The hydrochloric acid can be used in the chlorine dioxide generator as a feed chemical. A typical method of operating in this manner would be as follows:

Sodium chlorate, hydrogen chloride and sulfuric acid are fed to a reactor operating at high acidity (about 10 N). The spent liquor containing excess sulphuric acid is mixed with sodium chloride and reacted at a high temperature of 600–800° C. Under these conditions, the sodium chloride reacts with the sulfuric acid to form hydrochloric acid and anhydrous sodium sulfate. In one experiment the following conditions were used:

Sodium chloride added to end liquor=95% of equivalent acid in liquor;
Reaction temperature: 760° C.;
Sodium chloride in product: 11%.

The recovered hydrochloric acid is fed to the reactor and provides the total feed requirement. The sodium sulfate is obtained as a by-product.

The invention provides flexibility in the quantities of byproduct chlorine and sodium sulfate produced. Thus, the amount of chlorine produced can be varied over a wide range from a small quantity to about 1.0 pound/pound of chlorine dioxide. The quantity of sodium sulfate produced can also be varied in a range from about 1½ to 3 pounds/pound of chlorine dioxide. A benefit of such flexibility is that it is possible to select the most economic combination of reactants for a given location.

Another advantage of the present process lies in its simplicity which makes possible a low capital cost of plant and operating ease. The rapid reaction condition set forth make it possible to provide small reactor volume. The simplicity of the sodium sulfate recovery procedure is, of course, due to the elimination of excess acid in the terminal liquor whereby the neutral sodium sulfate is recovered either by cooling or evaporation.

The invention also provides for the recycling of chemicals from the spent liquor which improves the economy of the process and eliminates acid wastes.

We claim:
1. In a process of producing chlorine dioxide by effecting the reaction of sodium chlorate with a chloride selected from the group consisting of sodium chloride and hydrochloric acid and at least one of a group consisting of sulfuric acid and sulfuric dioxide in a solution, the steps which comprise maintaining in said solution a concentration of said chloride exceeding 0.5 and up to about 4.5 molar of said chloride and of said chlorate exceeding 0.5 molar, maintaining the acidity of said solution from about 1.8 to a value less than 6 normal, said reaction resulting in the formation of chlorine, chlorine dioxide and simultaneously therewith neutral sodium sulfate, removing said chlorine and chlorine dioxide as formed in said reaction, and recovering said neutral sodium sulfate directly from the spent liquor of said reaction.

2. The process of producing chlorine dioxide as defined in claim 1, wherein said concentration of each of said chlorate and chloride is maintained in excess of 1 molar and the acidity of said solution is maintained at less than 3 normal.

3. A process of producing chlorine dioxide as defined in claim 1, wherein the temperature of said reacting solution is at least 40° C.

4. A process of producing chlorine dioxide as defined in claim 1, wherein the temperature of said reacting solution is in the range of about 40° C. to 107° C.

5. The process of producing chlorine dioxide as defined in claim 1, wherein said step of recovering neutral sodium sulfate includes the step of cooling said spent liquor to cause crystallization of said sodium sulfate.

6. The process of producing chlorine dioxide as defined in claim 1, wherein said step of recovering neutral sodium sulfate includes the step of subjecting said spent liquor to evaporation to cause crystallization of said sodium sulfate.

7. In a continuous process for producing chlorine dioxide by feeding sodium chlorate and a chloride selected from the group consisting of sodium chloride and hydrochloric acid to a reaction liquor containing at least one of a group consisting of sulfuric acid and sulfur dioxide, the steps which comprise maintaining in said liquor a concentration of said chloride exceeding 0.5 and up to about 4.5 molar and of said chlorate exceeding 0.5 molar, maintaining the acidity of said liquor from about 1.8 to a value less than 6 normal, the consequent reaction resulting in the formation of chlorine, chlorine dioxide and, simultaneously therewith, neutral sodium sulfate, removing said chlorine and chlorine dioxide as formed in said reaction, withdrawing spent liquor from said reaction, recovering said neutral sodium sulfate from said spent liquor, and recycling the mother liquor remaining from said recovery step to said reaction liquor.

8. A continuous process for producing chlorine dioxide which comprises feeding a reaction mixture consisting essentially of sulfur dioxide, aqueous sodium chlorate, and aqueous sodium chloride to a reaction vessel, maintaining in said reaction mixture a concentration of said chloride exceeding 0.5 and up to about 4.5 molar and of said chlorate exceeding 0.5 molar, and maintaining the acidity of said reaction mixture at about 1.8 to a value less than 6 normal, the consequent reaction resulting in the formation of chlorine, chlorine dioxide and, simultaneously therewith, neutral sodium sulfate, removing said chlorine and chlorine dioxide as formed in said reaction, withdrawing the spent liquor of said reaction from said reaction vessel, and subjecting said spent liquor to a treatment for crystallizing said neutral sodium sulfate therein.

9. A continuous process for producing chlorine dioxide as defined in claim 8, wherein said crystallizing treatment comprises cooling said spent liquor.

10. A continuous process for producing chlorine dioxide as defined in claim 8, wherein said crystallizing treatment comprises subjecting said spent liquor to an evaporation step.

11. A continuous process for producing chlorine dioxide which comprises feeding a reaction mixture consisting essentially of sulfuric acid, aqueous sodium chlorate and aqueous sodium chloride to a reaction vessel, maintaining in said reaction mixture a concentration of said chloride exceeding 0.5 and up to about 4.5 molar and of said chlorate exceeding 0.5 molar, maintaining the acidity of said reaction mixture at about 1.8 to 3 normal, the consequent reaction resulting in the formation of chlorine, chlorine dioxide and, simultaneously therewith, neutral sodium sulfate, removing said chlorine and chlorine dioxide as formed in the consequent reaction, withdrawing the spent liquor from said reaction vessel, subjecting said spent liquor to a treatment for crystallizing said neutral sodium sulfate therein, removing the sodium sulfate crystals from said liquor, and recycling the remaining liquor to said reaction vessel.

12. A continuous process for producing chlorine dioxide which comprises feeding dry sodium chlorate and dry sodium chloride to a reaction liquor containing at least one of a group consisting of sulfuric acid and sulfur dioxide, maintaining in said liquor a concentration of said chloride exceeding 0.5 and up to about 4.5 molar and of said chlorate exceeding 0.5 molar, maintaining the acidity of said reaction liquor from about 1.8 to a value less than 6 normal, the consequent reaction resulting in the formation of chlorine, chlorine dioxide and, simultaneously therewith, neutral sodium sulfate, removing said chlorine and chlorine dioxide as formed in said reaction, withdrawing the spent liquor of said reaction containing crystals of said neutral sodium sulfate formed in said reaction, and removing said crystals from said liquor.

References Cited

UNITED STATES PATENTS

| 2,317,443 | 4/1943 | Cunningham | 23—152 |
|---|---|---|---|
| 2,344,346 | 3/1944 | Evans | 23—152 |
| 2,373,830 | 4/1945 | Holst | 23—152 |
| 2,481,240 | 9/1949 | Rapson et al. | 23—152 |
| 2,811,420 | 10/1957 | Pernert | 23—152 |
| 2,895,801 | 7/1959 | Northgraves | 23—152 |
| 2,936,219 | 5/1960 | Rapson | 23—152 |
| 2,969,276 | 1/1961 | Hirschberg | 23—152 |

FOREIGN PATENTS

| 639,085 | 6/1950 | Great Britain. |
|---|---|---|
| 649,562 | 1/1951 | Great Britain. |

MILTON WEISSMAN, *Primary Examiner.*

EDWARD STERN, *Examiner.*